US012689804B2

(12) United States Patent
Li et al.

(10) Patent No.: US 12,689,804 B2
(45) Date of Patent: Jul. 21, 2026

(54) INTERACTION METHOD AND DEVICE, STORAGE MEDIUM AND COMPUTER PROGRAM PRODUCT

(71) Applicant: Beijing Bytedance Network Technology Co., Ltd., Beijing (CN)

(72) Inventors: Yijie Li, Beijing (CN); Haiqian Wang, Beijing (CN); Rongrong Zheng, Beijing (CN); Linxing Li, Beijing (CN); Xuyuan Xiang, Beijing (CN); Wen Ruan, Beijing (CN); Yanran Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 107 days.

(21) Appl. No.: 18/550,273

(22) PCT Filed: Mar. 11, 2022

(86) PCT No.: PCT/CN2022/080441
§ 371 (c)(1),
(2) Date: Sep. 12, 2023

(87) PCT Pub. No.: WO2022/188875
PCT Pub. Date: Sep. 15, 2022

(65) Prior Publication Data
US 2024/0163517 A1 May 16, 2024

(30) Foreign Application Priority Data
Mar. 12, 2021 (CN) .......................... 202110269126.9

(51) Int. Cl.
*H04N 21/475* (2011.01)
(52) U.S. Cl.
CPC .............................. *H04N 21/4756* (2013.01)

(58) Field of Classification Search
CPC ............. H04N 21/4756; H04N 21/475; H04N 21/4758; G06F 3/0481; G06F 3/0482; G06F 3/0484
(Continued)

(56) References Cited

U.S. PATENT DOCUMENTS 9,117,198 B1 * 8/2015 Richards .............. G06Q 10/103
9,344,519 B2 * 5/2016 Perincherry ......... H04N 21/252
(Continued)

FOREIGN PATENT DOCUMENTS

CN        101127871 A      2/2008
CN        101295211 A     10/2008
(Continued)

OTHER PUBLICATIONS

ISA China National Intellectual Property Administration, International Search Report and Written Opinion Issued in Application No. PCT/CN2022/080441, May 27, 2022, WIPO, 12 pages.
(Continued)

*Primary Examiner* — Sahar Aqil Riaz
(74) *Attorney, Agent, or Firm* — Alleman Hall LLP

(57) ABSTRACT

Embodiments of the present disclosed provides an interaction method and device, a storage medium, and a computer program product, including displaying an input control during a process of playing a first media content through a playback control in an interaction interface; obtaining input information of a current user from the input control; displaying the input information and associated information of the input information; and judging whether the input information and the associated information meet a preset condition, and displaying a second media content based on a result of the judging.

12 Claims, 8 Drawing Sheets

(58) Field of Classification Search
USPC ............................................................. 725/37
See application file for complete search history.

(56) References Cited

U.S. PATENT DOCUMENTS

| | | | |
|---|---|---|---|
| 9,459,794 B1* | 10/2016 | Soegiono | G06F 3/0486 |
| 10,475,066 B1* | 11/2019 | Kakani | G06Q 30/0245 |
| 10,691,786 B1* | 6/2020 | Park | G06F 3/0488 |
| 11,238,471 B2* | 2/2022 | Montoya | G06F 16/9538 |
| 11,335,302 B2* | 5/2022 | Rojas | G06F 3/04845 |
| 2005/0193414 A1* | 9/2005 | Horvitz | H04N 21/47 |
| | | | 725/89 |
| 2009/0104592 A1* | 4/2009 | Miltenberger | G09B 7/00 |
| | | | 434/362 |
| 2011/0282712 A1* | 11/2011 | Amos | G06Q 99/00 |
| | | | 705/500 |
| 2012/0150654 A1 | 6/2012 | Sathyanath et al. | |
| 2013/0247078 A1* | 9/2013 | Nikankin | H04N 21/44204 |
| | | | 725/13 |
| 2014/0100924 A1* | 4/2014 | Ingenito | G06Q 10/10 |
| | | | 705/12 |
| 2014/0149935 A1* | 5/2014 | Johnson | G06F 3/0485 |
| | | | 715/811 |
| 2014/0180761 A1* | 6/2014 | Yolles | G06Q 50/06 |
| | | | 705/7.29 |
| 2014/0298260 A1* | 10/2014 | Abowd | G06F 3/04842 |
| | | | 715/810 |
| 2015/0261741 A1* | 9/2015 | Ueda | G06F 16/3344 |
| | | | 704/10 |
| 2016/0189380 A1* | 6/2016 | Li | H04N 13/183 |
| | | | 348/50 |
| 2016/0275080 A1* | 9/2016 | Xia | G06Q 50/01 |
| 2017/0185596 A1* | 6/2017 | Spirer | G06F 40/134 |
| 2018/0047070 A1* | 2/2018 | Koenig | G06Q 30/0282 |
| 2018/0082331 A1* | 3/2018 | Feldman | G06Q 30/0255 |
| 2019/0028758 A1* | 1/2019 | Talvensaari | H04N 21/8126 |
| 2019/0130815 A1 | 5/2019 | Thien | |
| 2020/0227033 A1* | 7/2020 | Gustman | G06F 3/167 |
| 2021/0183261 A1* | 6/2021 | Kawasaki Fortner | G09B 7/08 |
| 2021/0235163 A1* | 7/2021 | Hirsch | H04N 21/812 |
| 2022/0086208 A1* | 3/2022 | Mitic | H04L 67/1097 |
| 2022/0230603 A1* | 7/2022 | Rojas | G06F 3/04845 |
| 2024/0038089 A1* | 2/2024 | Kawasaki Fortner | G09B 7/04 |

FOREIGN PATENT DOCUMENTS

| | | |
|---|---|---|
| CN | 102890592 A | 1/2013 |
| CN | 103997688 A | 8/2014 |
| CN | 105872828 A | 8/2016 |
| CN | 106651604 A | 5/2017 |
| CN | 107025043 A | 8/2017 |
| CN | 107277636 | 10/2017 |
| CN | 108304458 | 7/2018 |
| CN | 108762878 A | 11/2018 |
| CN | 108874120 7 | 11/2018 |
| CN | 208507176 11 | 2/2019 |
| CN | 110166803 A | 8/2019 |
| CN | 110213613 8 | 9/2019 |
| CN | 110491218 /9 | 11/2019 |
| CN | 110598010 10 | 12/2019 |
| CN | 111324246 A | 6/2020 |
| CN | 111435999 A | 7/2020 |
| CN | 112000232 A | 11/2020 |
| JP | H06303517 A | 10/1994 |

OTHER PUBLICATIONS

China National Intellectual Property Administration, Office Action and Search Report Issued in Application No. 202110269126.9, May 27, 2023, 9 pages. Submitted with partial English translation.

"Preciousness Lies in Precision, Importance Lies in Precision, Success or Failure Lies in Precision," China Youth on Line Website, Nov. 26, 2020, 8 pages. Submitted with partial English explanation.

"The Typical Case of Mr. Luo Xiang: Hilarious Robber Having Highest Quality in History," bilibili Website, Available Online at www.bilibili.com/video/BV1vv4y1f7Mm?spm_id_from=333.337.search-card.all.click, Jan. 24, 2021, 1 page.

China National Intellectual Property Administration, Office Action and Search Report Issued in Application No. 202110269126.9, Apr. 25, 2024, 8 pages.

* cited by examiner

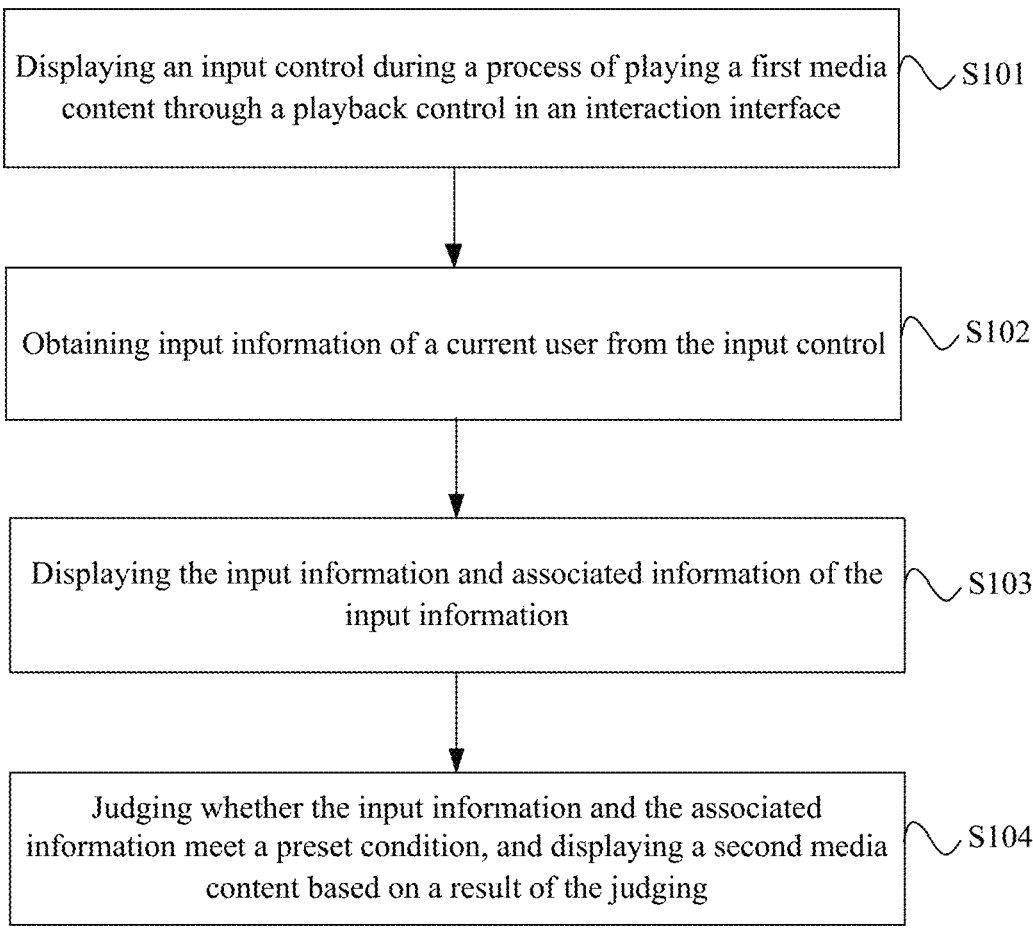

Displaying an input control during a process of playing a first media content through a playback control in an interaction interface ⎯ S101

Obtaining input information of a current user from the input control ⎯ S102

Displaying the input information and associated information of the input information ⎯ S103

Judging whether the input information and the associated information meet a preset condition, and displaying a second media content based on a result of the judging ⎯ S104

FIG. 1

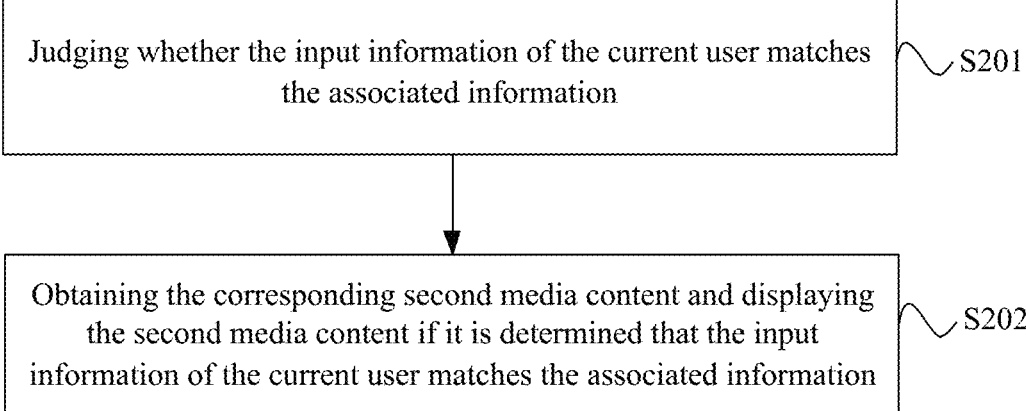

Judging whether the input information of the current user matches the associated information ⎯ S201

Obtaining the corresponding second media content and displaying the second media content if it is determined that the input information of the current user matches the associated information ⎯ S202

INTERACTION METHOD AND DEVICE, STORAGE MEDIUM AND COMPUTER PROGRAM PRODUCT

CROSS-REFERENCE TO RELATED APPLICATIONS

The present application is a National Stage of International Application No. PCT/CN2022/080441, filed on Mar. 11, 2022, which claims priority to Chinese Patent Application No. 202110269126.9, filed on Mar. 12, 2021, both of the applications are hereby incorporated by reference in their entireties.

TECHNICAL FIELD

Embodiments of the present disclosure relates to the technical field of computer and network communication, in particular, to an interaction method and device, a storage medium, a computer program product, and a computer program.

BACKGROUND

At present, in some variety shows, there is usually a situation where an on-site judge and/or an on-site viewer scores or votes for a contestant. A final score of the contestant is determined based on a result of the scoring or voting by the on-site judge and/or the on-site viewer.

SUMMARY

Embodiments of the present disclosure provide an interaction method and device, a storage medium, a computer program product, and a computer program.

In a first aspect, an embodiment of the present disclosure provides an interaction method, including:

displaying an input control during a process of playing a first media content through a playback control in an interaction interface;

obtaining input information of a current user from the input control;

displaying the input information and associated information of the input information;

judging whether the input information and the associated information meet a preset condition, and displaying a second media content based on a result of the judging.

In a second aspect, an embodiment of the present disclosure provides an interaction device, including:

a displaying unit, configured to display an input control during a process of playing a first media content through a playback control in an interaction interface;

an input unit, configured to obtain input information of a current user from the input control;

where the displaying unit is further configured to display the input information and associated information of the input information;

a processing unit, configured to judge whether the input information and the associated information meet a preset condition, and display a second media content based on a result of the judging.

In a third aspect, an embodiment of the present disclosure provides an electronic device, including at least one processor, a memory, and a display;

where the memory stores computer execution instructions;

the at least one processor executes the computer execution instructions stored in the memory, enabling the at least one processor to execute the method described in the first aspect and various possible designs of the first aspect.

In a fourth aspect, an embodiment of the present disclosure provides a computer readable storage medium, where the computer readable storage medium stores computer execution instructions, and when the computer execution instructions are executed by a processor, the method described in the first aspect and various possible designs of the first aspect is implemented.

In a fifth aspect, an embodiment of the present disclosure provides a computer program product, including computer instructions, where when the computer instructions are executed by a processor, the method described in the first aspect and various possible designs of the first aspect is implemented.

In a sixth aspect, an embodiment of the present disclosure provides a computer program where when the computer program is executed by a processor, the method described in the first aspect and various possible designs of the first aspect is implemented.

BRIEF DESCRIPTION OF THE DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate merely some embodiments of the present disclosure, and persons of ordinary skill in the art may still derive other drawings from these accompanying drawings without creative effort.

FIG. 1 is a flowchart of an interaction method provided by an embodiment of the present disclosure;

FIG. 2 is a flowchart of an interaction method provided by another embodiment of the present disclosure;

DESCRIPTION OF EMBODIMENTS

Figure 3A:
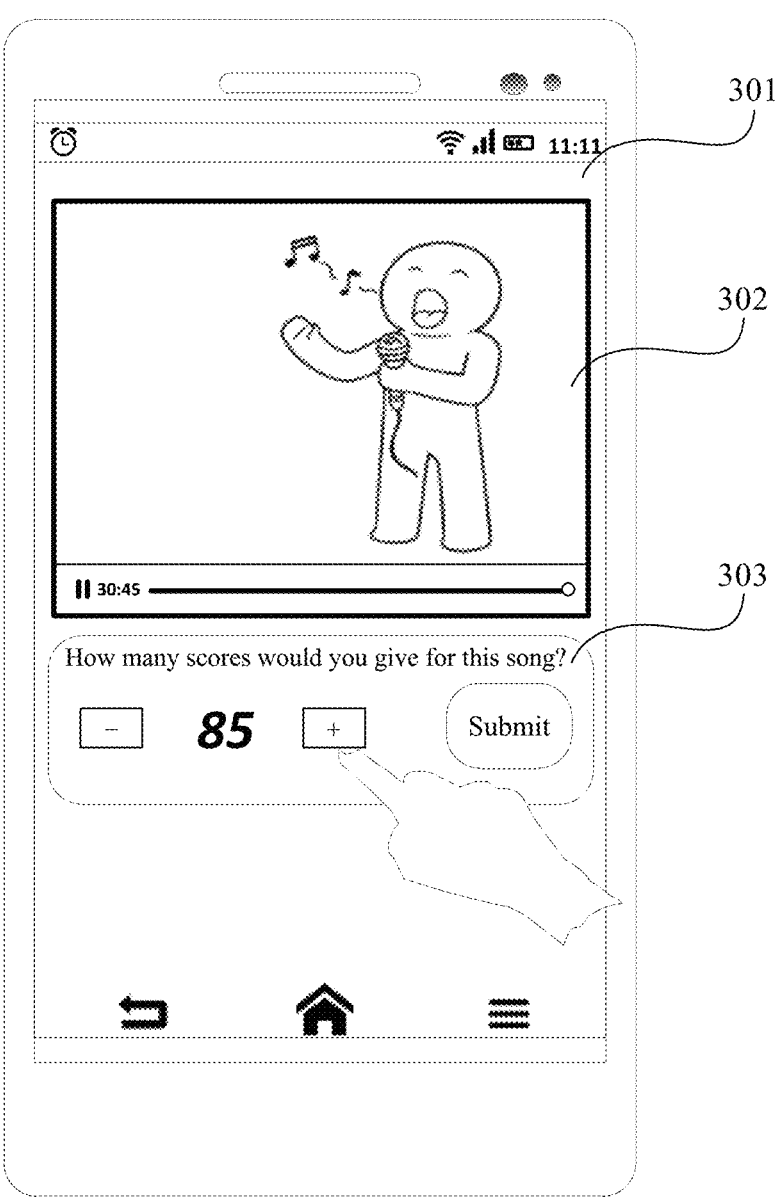
FIG. 3a is a schematic diagram of an interaction interface provided by an embodiment of the present disclosure.

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

At present, in some variety shows, such as, some performance competition shows, there is usually a situation where an on-site judge and/or an on-site viewer scores or votes for a contestant. A final score of the contestant is determined based on a result of the scoring or voting by the on-site judge and/or the on-site viewer.

However, in the prior art, in a variety show a contestant can only be scored or voted for by an on-site judge and/or an on-site viewer, while a viewer who watches the show online through a terminal device, such as, a mobile phone, a computer, and a television, can only watch a process of scoring or voting for a contestant by the on-site judge and/or the on-site viewer, and cannot participate in the process of scoring or voting. The viewer who watches the show online cannot interact with the program content or express an opinion, thus the viewer who watches the show online lacks a way to make deeper interaction with the program content, resulting in a weak sense of participation and immersion, which affects viewing experience of the user for the show.

In response to the above technical problem, an embodiment of the present disclosure provides an interaction method for a terminal device, such as, a mobile phone, a computer, a televisions, etc., the terminal device displays an input control during a process of playing a first media content through a playback control in an interaction interface; a current user may express an attitude thereof for the first media content by inputting certain input information through the input control, and the terminal device may obtain the input information of the current user from the input control, and display the input information and associated information of the input information; as well as display a second media content when the input information and the associated information meet a preset condition. Through the interaction method provided in the embodiment of the present disclosure, it is possible to provide a way for a user to express an attitude thereof through an input control during a process of the user online viewing a first media content, and provide feedback through a second media content, thereby improving the sense of participation and immersion in viewing the first media content, and improving the viewing experience of the user.

Referring to FIG. 1, FIG. 1 is a flowchart of an interaction method provided by an embodiment of the present disclosure. The method of this embodiment may be applied to an electronic device, such as, a terminal device, or a server, and the interaction method includes:

S101, displaying an input control during a process of playing a first media content through a playback control in an interaction interface.

In this embodiment, the first media content may be played through the playback control in the interaction interface of the electronic device. The first media content includes but is not limited to a form of a video, an audio, a text, an image, etc., and further some media contents of live streaming. Correspondingly, the playback control may be a video playback control, an audio playback control, a text playback control, an image playback control, etc.

The input control may be displayed during the process that the first media content is played through the playback control, the input control is used for a user currently using the electronic device to input certain specific input information. The input control includes but is not limited to a text input box, a numerical input box, a button, a list box, etc. By inputting information, the current user may interact with the first media content or express an opinion. For example, in an application scenario of scoring or voting for a contestant in a variety show video, the input control may be an input control for scoring or voting for a contestant. Correspondingly, the input control may be a score input control or a selection instruction input control for voting. In an implementation, the score input control may be a linear slider, a knob control, or a stepper with an added addition/subtraction button, which may quickly increase or decrease a score value. For another example, in an application scenario of scoring or voting for a music in an audio in a music show, the input control may be an input control for scoring or voting for a music, and so on. Other application scenarios will not be described in detail here.

In an implementation, S101 may specifically be: during the process of playing the first media content through the playback control in the interaction interface, displaying the input control if it is detected that the first media content is played to a preset moment, or the first media content is played to a preset content.

In an implementation, for example, if an interaction is required for the first media content at a preset moment such as at 10th minute after the first media content is played, a preset time is set to the 10th minute after the first media content is played, and the input control is displayed when it is detected that the first media content is played to the 10th minute. In another implementation, if it is detected that the first media content is played to a preset content, for example, when it is detected that an image of scoring or voting appears in the first media content, or when it is detected that a host initiates an instruction of scoring or voting, or when it is detected that a performance of a contestant ends, or when it is detected that an on-site judge and/or an on-site starts scoring or voting, the input control may be displayed. Of course, the preset content is not limited to the above examples.

In an implementation, after the input control is displayed, a timing tool may also be displayed, which may be used to perform counting up or counting down to prompt the current user to complete an input of input information within a specified time. After the specified time is reached, the input control is controlled to be no longer displayed, which means the input of input information stops.

S102, obtaining input information of a current user from the input control.

In this embodiment, after the current user inputs certain input information through the input control, the electronic device may obtain the input information input by the current user from the input control, such as score information scored by the current user or object information selected during voting.

S103, displaying the input information and associated information of the input information.

In this embodiment, after the input information of the current user is obtained, the associated information of the input information may also be obtained. The associated information may be determined based on an actual scenario. For example, in an application scenario of scoring or voting for a contestant in a variety show video, the input information is a score given by the current user to the contestant, and the associated information may be a final score of the contestant; or the input information may be a contestant selected by the current user when voting, and the associated information may be a final result of voting, or the associated information may also be a contestant with a highest number of votes. For another example, if the first media content is a media content of a scenario of knowledge question-answer or quiz, the input information may be an answer input by the current user for a question, and the associated information may be a correct answer to the question. In other application scenarios, the associated information may also be information of other contents, which will not be elaborated here.

S104, judging whether the input information and the associated information meet a preset condition, and displaying a second media content based on a result of the judging.

In this embodiment, in the meantime that the input information and the associated information of the input information are displayed, or after the input information and the associated information of the input information are displayed, it is also possible to judge whether the input information and associated information meet the preset condition, and thus the second media content is displayed based on the result of the judging. The second media content may be used to provide feedback for the input information of the current user, which may include at least one of a special effect animation, an image, a text label, and an audio. Of course, the second media content may also include other forms and purposes, which may be determined based on actual scenarios.

For example, in an application scenario of scoring or voting for a contestant in a variety show video, if a result of scoring or voting by the current user for the contestant matches a final result of scoring or voting, a specific media content may be displayed, such as, a special effect animation such as a flower, an applause, a smiling face may be displayed, or a specific tag or an image (such as, a tag or an image including appreciation and encouragement) may be displayed, or specific music may also be played, which is used as feedback of the interaction with the current user. Of course, if a result of scoring or voting by the current user for the contestant does not match a final result of scoring or voting, another specific media content may also be displayed, such as, a special effect animation such as a crying face may also be displayed, or another specific tag or image (such as, a tag or an image including a failed or inaccurate evaluation) may also be displayed, or another specific music may also be played, which is used as feedback of the interaction with the current user. In addition, the current user may also select the second media content that needs to be displayed, such as, selecting different special effects animations.

The interaction method provided in this embodiment is performed by displaying an input control during a process of playing a first media content through a playback control in an interaction interface; obtaining input information of a current user from the input control; displaying the input information and associated information of the input information; and judging whether the input information and the associated information meet a preset condition, and displaying a second media content based on a result of the judging. This embodiment provides a way for the current user to interact and express an opinion with the first media content during a process of the current user viewing the first media content, and provides feedback to the current user through the second media content, thereby improving the sense of participation and immersion of the user, and improving the viewing experience of the user.

On the basis of any one of the above embodiments, as shown in FIG. 2, the judging whether the input information and the associated information meet the preset condition, and displaying the second media content based on the result of the judging in S104, includes:

S201, judging whether the input information of the current user matches the associated information;

S202, obtaining the corresponding second media content and displaying the second media content if it is determined that the input information of the current user matches the associated information.

In this embodiment, the associated information refers to relevant information of the input information, which may be comprehensive information obtained based on input information of multiple users, or if the input information is a subjective opinion of a user, the associated information may also be comprehensive information determined based on subjective opinions of multiple different users The associated information may be determined according to an actual scenario. For example, in an application scenario of scoring or voting for a contestant in a variety show video, the input information is a score given by the current user to the contestant, and the associated information may be a final score of the contestant; or the input information is a contestant selected by the current user when voting, and the associated information may be a final result of voting, or the associated information may also be a contestant with a highest number of votes. For another example, if the first media content is a media content of a scenario of knowledge question-answer or quiz, the input information may be an answer input by the current user for a question, and the associated information may be a correct answer to the question. In other application scenarios, the associated information may also be information of other contents, which will not be elaborated here.

Therefore, based on the input information of the current user and the associated information, whether the input information of the current user matches the associated information can be judged. For example, for a numerical value, it is possible to determine whether they match with each other by judging whether a difference is within a preset threshold range. For text, it is possible to determine whether they match with each other by judging whether a similarity of texts reaches a preset similarity threshold, and so on, which will not be elaborated here.

Furthermore, when it is determined that the input information of the current user matches the associated information, a corresponding second media content is obtained, where the second media content may be pre-stored in a memory of an electronic device, and the second media content is obtained from the memory of the electronic device. Of course, the second media content may also be pre-stored in a server connected to an electronic device, and the second media content may be obtained from the server. After the second media content is obtained, the second media content may be displayed, such as, a special effect animation such as a flower, an applause, a smiling face may be displayed, or a specific tag or an image (such as, a tag or an image including appreciation and encouragement) may be displayed, or specific music may also be played.

It should be noted that in this embodiment, it is determined whether the input information of the current user matches the associated information, where a preset condition is to determine whether the input information of the current user matches the associated information, if they match with each other, a certain second media content is displayed.

In another implementation, the preset condition may also be to determine whether the input information of the current user does not match the associated information. If they do not match with each other, another type of second media content is displayed, for example, another specific media content such as, a special effect animation such as a crying face, or another specific tag or image (such as, a tags or an image including a failed or inaccurate evaluation) may also be displayed, or another specific music may also be played. For the convenience of description, in this embodiment, another type of second media content may be recorded as a third media content, that is, if it is determined that the input information of the current user does not match the associated information, a corresponding third media content is obtained and displayed.

On the basis of any one of the above embodiments, this embodiment provides an interaction method in an application scenario of scoring the first media content. As shown in FIG. 3a, in the interaction interface 301 of the electronic device, the first media content is played through the playback control 302, during which the input control may be displayed, where the input control includes a score input control 303, which may be a linear slider, a knob control, or a stepper with an added addition/subtraction button (the addition button is used to increase the score, and the subtraction button is used to decrease the score).

In this embodiment, during the process of playing the first media content through the playback control 302 in the interaction interface 301, if it is detected that the first media content is played to a preset moment, or the first media content is played to a preset content, the score input control 303 is displayed.

Furthermore, the obtaining the input information from the input control in S102 specifically includes:

obtaining, from the score input control 303, a score input instruction input by the current user for the first media content, and determining, based on the score input instruction, first score information input by the current user.

In this embodiment, after the score input control 303 is displayed, the current user may issue a score input instruction through the score input control 303. As shown in FIG. 3a, the score input instruction may include first score information input by the current user, and then the electronic device may obtain the first score information input by the current user based on the score input instruction.

Furthermore, on the basis of the above embodiments, before the displaying the input information and the associated information of the input information in S103, the method further includes:

obtaining second score information, and determining the second score information as the associated information of the first score information input by the current user, where the second score information is score information which is obtained based on the first score information input by multiple different users.

Figure 3B:
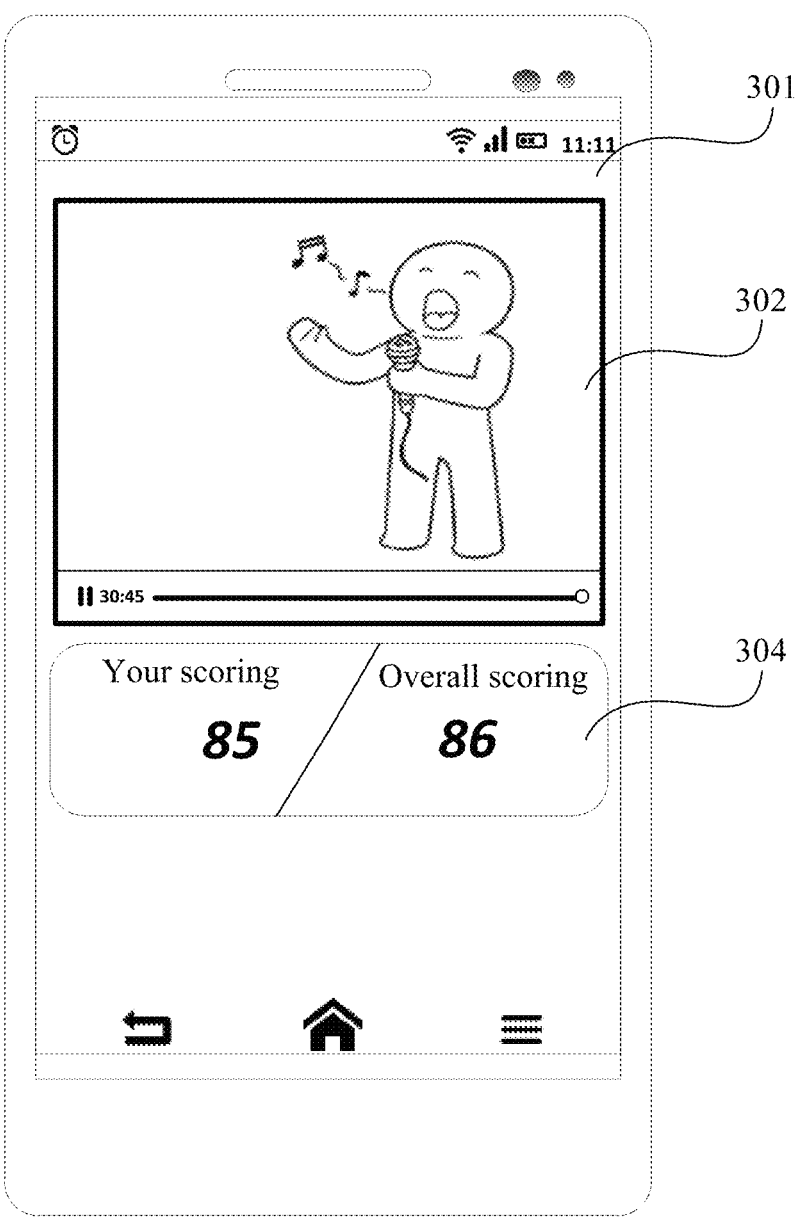
FIG. 3b is a schematic diagram of an interaction interface provided by another embodiment of the present disclosure.

In this embodiment, the current user may input the first score information through a score input control 303 of an electronic device thereof. Similarly, other users may also input first score information through score input controls 303 of electronic devices thereof, respectively. Each electronic device may send the first score information to a server, and the server may obtain second score information based on the first score information input by multiple different users, where the second score information may include, but is not limited to, a arithmetic mean, a weighted mean of the first score information input by the multiple different users. The server may then send the second score information to each electronic device to enable the electronic device to obtain the second score information. After obtaining the second score information, the electronic device may display the first score information input by the user and the obtained second score information in the display control 304. As shown in FIG. 3b, "Your scoring 85" is the first score information input by the user and "Overall scoring 86" is the second score information.

In an implementation, timing may also be performed when the score input control 303 is displayed to allow the current user to input the first score information within a predetermined time window. Correspondingly, the second score information is also score information obtained based on the first score information input by the multiple different users within the predetermined time window. Furthermore, the first score information input by the user and the second score information obtained may be displayed after the predetermined time window timing is completed.

Alternatively, in another implementation, the current electronic device may obtain first score information input by multiple different users sent by other electronic devices, and the current electronic device may obtain the second score information based on the first score information input by the current user and the first score information received from multiple different users, where the second score information may include, but is not limited to, a arithmetic mean, a weighted mean of the first score information input by the multiple different users. In addition, the current electronic device may further send the second score information to other electronic devices, so that other electronic devices may also obtain the second score information.

Furthermore, on the basis of above embodiments, the judging whether the input information of the current user matches the associated information in S104, includes:

if a difference between the first score information input by the current user and the second score information is within a preset threshold range, determining that the input information of the current user matches the associated information; or if a difference between the first score information input by the current user and the second score information is not within a preset threshold range, determining that the input information of the current user does not match the associated information.

Figure 3C:
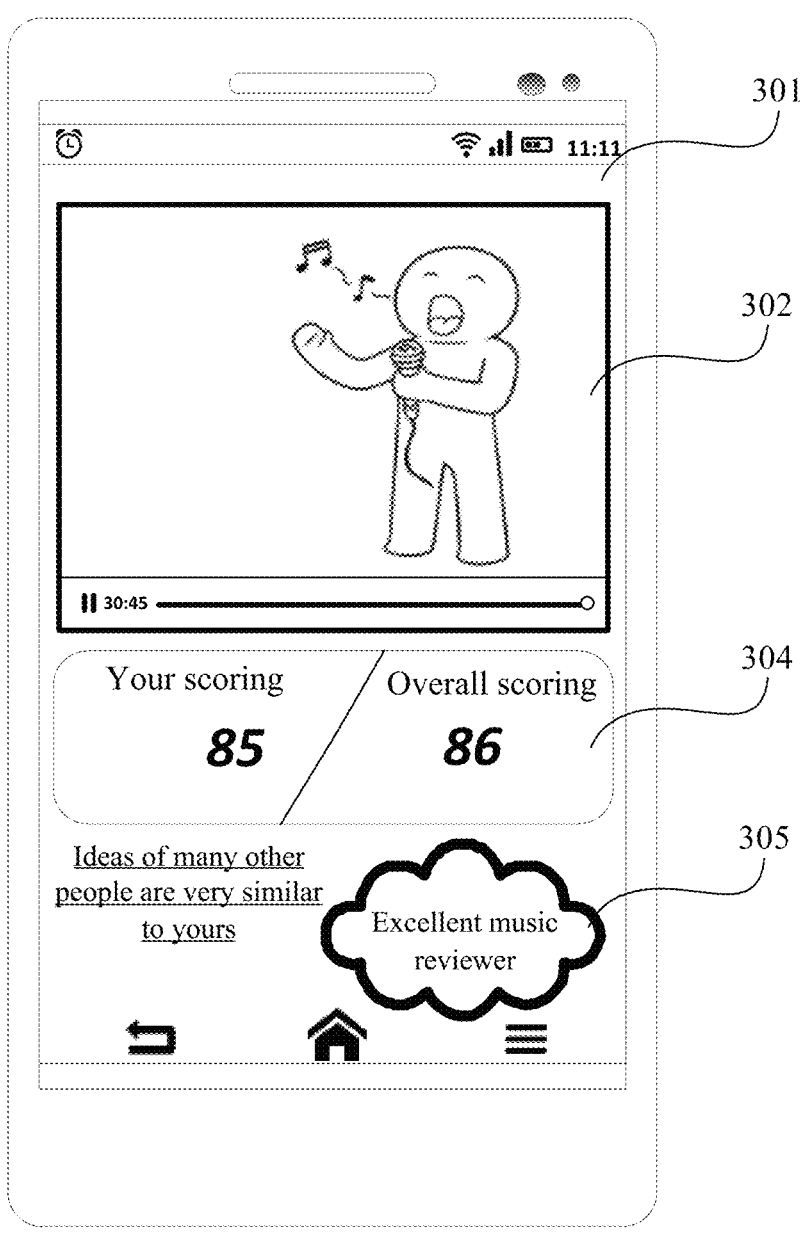
FIG. 3c is a schematic diagram of an interaction interface provided by another embodiment of the present disclosure.

In this embodiment, when whether the input information of the current user matches the associated information is determined, it may be determined whether the first score information input by the current user is close to the second score information, and a difference between the first score information input by the current user and the second score information may be obtained. Then, it may be determined whether the difference is within the preset threshold range, if the difference is within the preset threshold range, it indicates that the first score information input by the current user is close to the second score information, which means that the input information of the current user matches the associated information. Then a specific media content may be displayed, such as, a special effect animation such as a flower, an applause, a smiling face may be displayed, or a specific tag or an image (such as, a tag or an image including appreciation and encouragement) may be displayed, or specific music may also be played, which is used as feedback for that the input information of the current matches the associated information, such as, as shown in FIG. 3c, a label 305 of "Excellent music reviewer" and a text content of "Ideas of many other people are very similar to yours". If the difference is not within the preset threshold range, it indicates that the first score information input by the current user is not close to the second score information, which means that the input information of the current user does not match the associated information, and another specific media content may also be displayed, such as, a special effect animation such as a crying face, or another specific tag or image (such as, a tags or an image including a failed or inaccurate evaluation) may also be played, or another specific music may also be played, which is used as feedback for that the input information of the current user does not match the associated information.

Figure 4A:
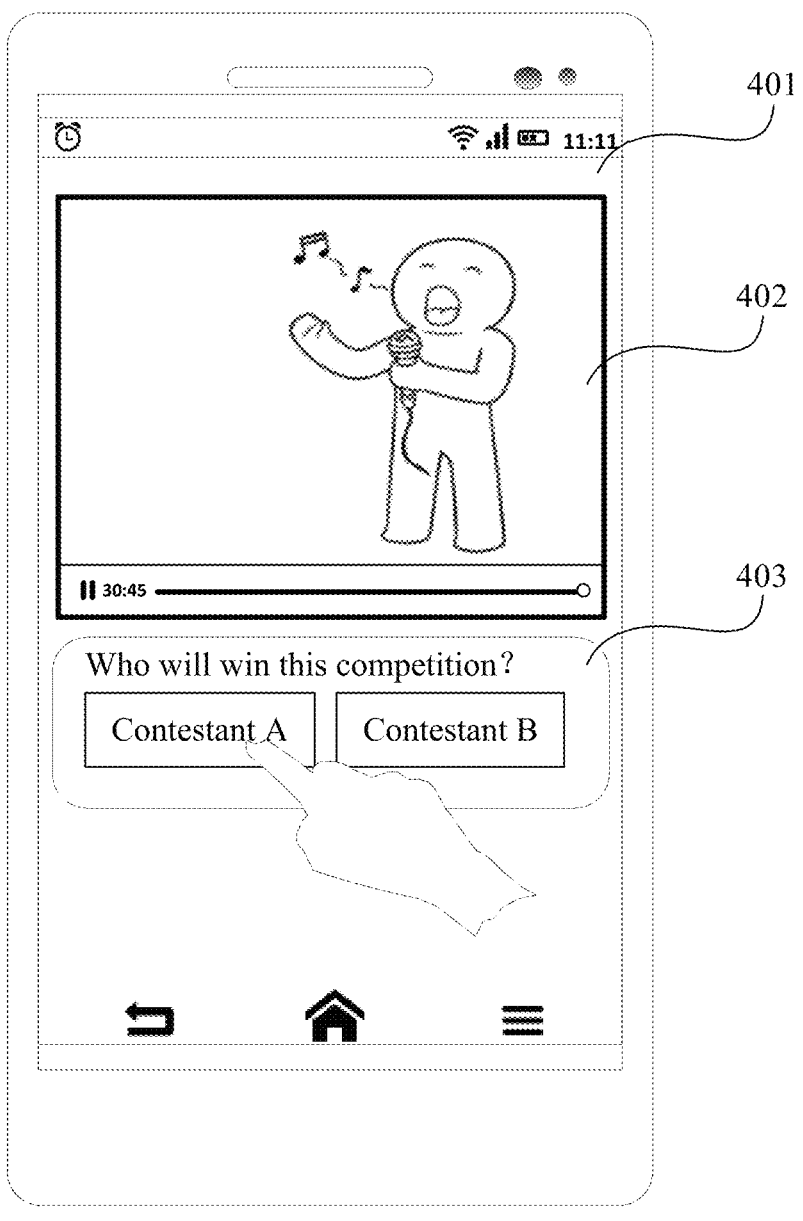
FIG. 4a is a schematic diagram of an interaction interface provided by another embodiment of the present disclosure.

On the basis of any of the above embodiments, this embodiment provides an interaction method in an application scenario of voting or guessing on the first media content. As shown in FIG. 4a, in an interaction interface 401 of an electronic device, the first media content is played through the playback control 402, during which the input control may be displayed, where the input control includes a selection instruction input control 403, which may be radio buttons, check buttons, a toggle switch, a selection label, a multiple-selection label, etc.

In this embodiment, during the process that the first media content through the playback control 402 in the interaction interface 401 is played, if it is detected that the first media content is played to a preset time, or the first media content is played to a preset content, a selection instruction input control 403 for at least two alternative contents is displayed, and relevant information of each alternative content, such as, images, texts, etc., may also be displayed simultaneously. For example, as shown in FIG. 4a, for guessing a winner from at least two contestants, a button for displaying "Contestant A" and a button for displaying "Contestant B" may be set in the selection instruction input control 403. The current user may click a button to make a selection. If the button for displaying "Contestant A" is clicked, a selection instruction for contestant A is input. In addition, names, photos, etc. of the at least two contestants may also be displayed, and corresponding selection instruction input controls 403 may be displayed. For example, a button is displayed below a photo of each contestant, and the current user may click a button below a photo of a certain contestant to select the contestant, which means that the selection instruction for such contestant is input.

Furthermore, the obtaining the input information from the input control 403 in S102, specifically includes:

obtaining a selection instruction input by the current user for at least two alternative contents from the selection instruction input control, and determining, based on the selection instruction, selection information of the current user for the alternative contents.

In this embodiment, after the selection instruction input control 403 is displayed, the current user may input the selection instruction for at least two alternative contents through the selection instruction input control 403. The selection instruction may include the selection information of the current user for the alternative contents, that is, what content(s) that the current user selects, thus the electronic device may obtain the selection information of the current user for the alternative contents based on the selection instruction. For example, in FIG. 4a, if the current user clicks the button for displaying "Contestant A", a selection instruction for contestant A is input; while if the current user clicks the button for displaying "Contestant B", a selection instruction for contestant B is input.

Furthermore, on the basis of the above embodiments, before the displaying the input information and the associated information of the input information in S103, the method may further include:

obtaining selection result information for the at least two alternative contents, and determining the selection result information as the associated information of the selection information of the current user for the alternative contents.

Figure 4B:
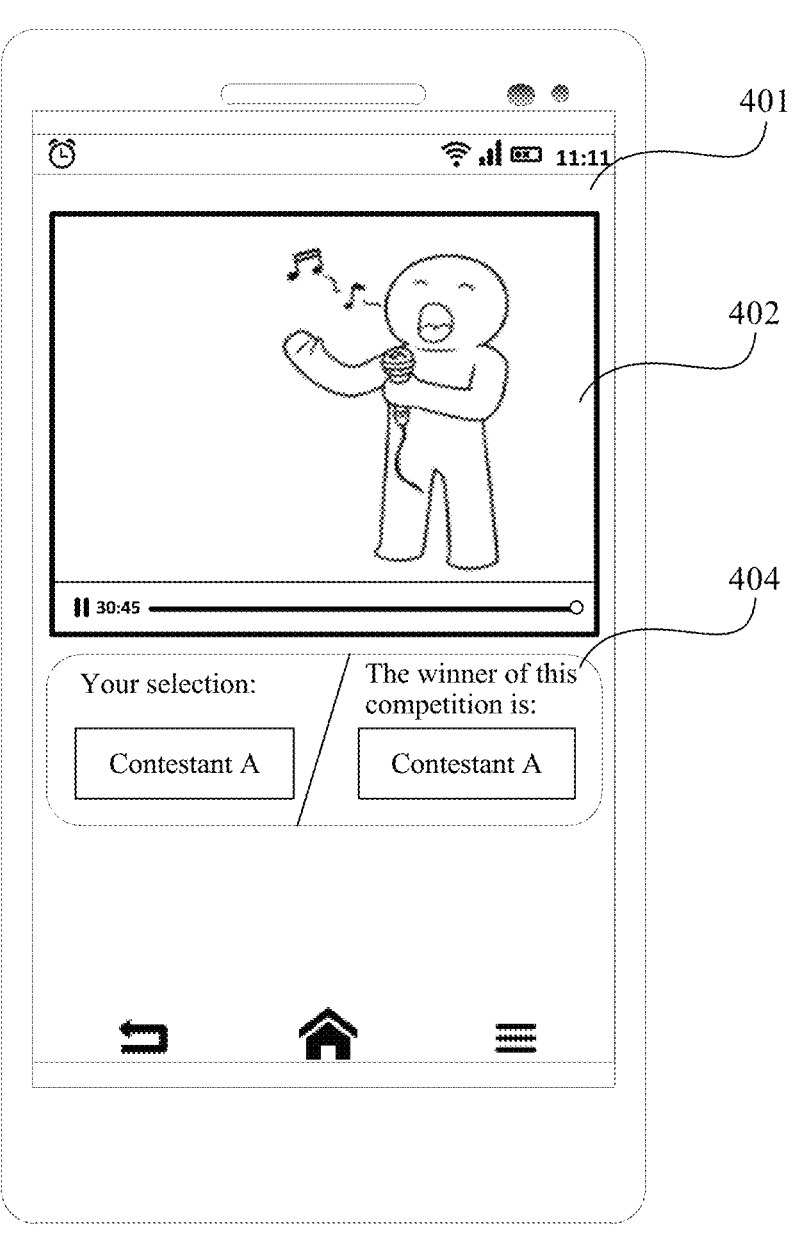
FIG. 4b is a schematic diagram of an interaction interface provided by another embodiment of the present disclosure.

In this embodiment, the associated information may be the selection result information for the alternative contents. For example, in a voting scenario, the associated information may be a final voting result for the alternative contents, may be a voting result determined based on selection information input by multiple different users, may be obtained by a server or the current electronic device; while in a guessing scenario, the associated information may not change with choices of the user (for example, in some knowledge guessing scenarios, the associated information may be answer information or result information for a guessing question), which may be pre-stored in an electronic device or a server, may be directly obtained from an electronic device or a server, or may also be obtained through other means. In addition, the associated information may also include statistical information on how many users' selection information matches the selection result information, or statistical information on how many users' selection information does not match the selection result information, and so on. As shown in FIG. 4b, the associated information is "The winner of this competition is contestant A", and the associated information may be displayed in the display control 404.

Furthermore, based on the above embodiments, the judging whether the input information of the current user matches the associated information in S104, includes:

if the selection information of the current user for the alternative contents is same as the selection result information, determining that the input information of the current user matches the associated information; or if the selection information of the current user for the alternative contents is different from the selection result information, determining that the input information of the current user does not match the associated information.

Figure 4C:
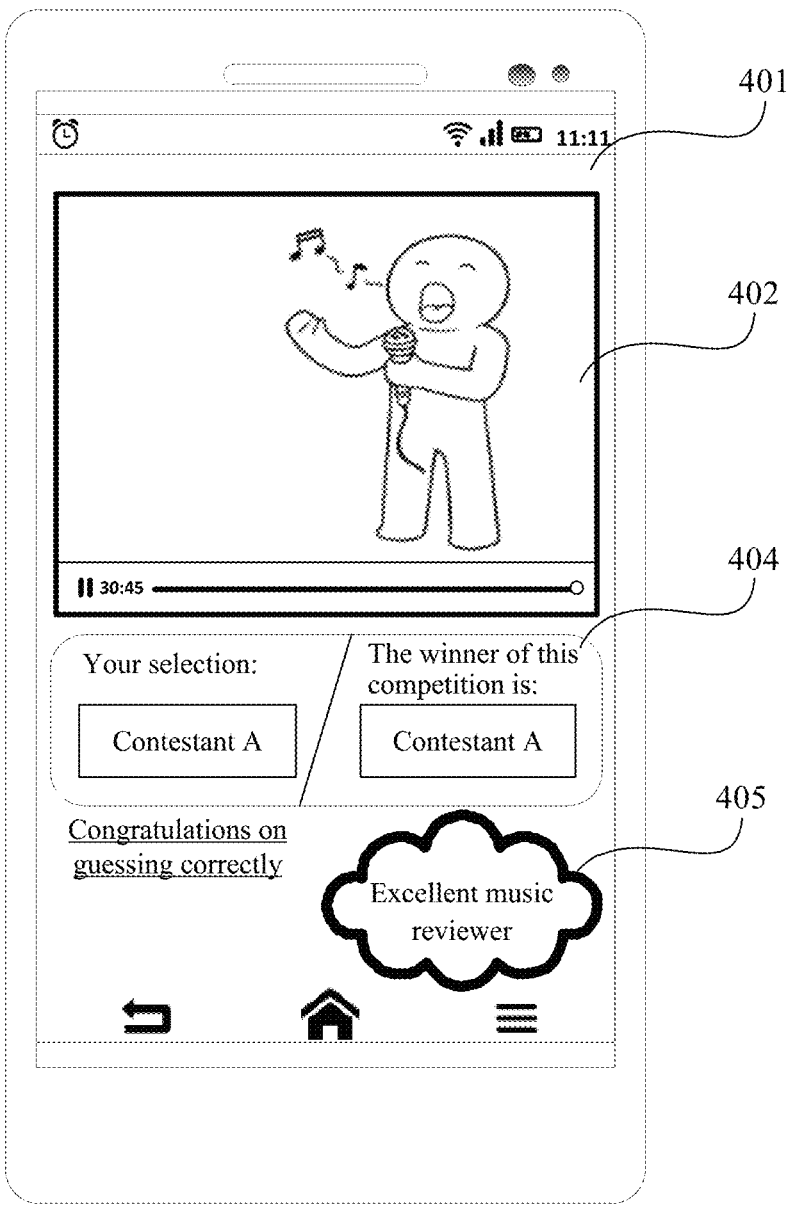
FIG. 4c is a schematic diagram of an interaction interface provided by another embodiment of the present disclosure.

In this embodiment, when determining whether the input information of the current user matches the associated information, it may be determined whether the selection information of the current user for the alternative contents is same as the selection result information. If it is determined that the selection information of the current user for the alternative contents is same as the selection result information, it is determined that the input information of the current user matches the associated information, and then a specific media content may be displayed, such as, a special effect animation such as a flower, an applause, a smiling face may be displayed, or a specific tag or an image (such as, a tag or an image including appreciation and encouragement) may be displayed, or specific music may also be played, which is used as feedback for that the input information of the current matches the associated information, such as, as shown in FIG. 4c, a label 405 of "Excellent music reviewer" and a text content of "Congratulations on guessing correctly". If it is determined that the selection information of the current user for the alternative contents is different from the selection result information, it is determined that the input information of the current user does not match the associated information, and another specific media content may also be displayed, such as, a special effect animation such as a crying face, or another specific tag or image (such as, a tags or an image including a failed or inaccurate evaluation) may also be displayed, or another specific music may also be played, which is used as feedback for that the input information of the current user does not match the associated information.

The interaction method provided by the above embodiments provides a way for the current user to interact and express an opinion with the first media content during a process of the current user viewing the first media content, and provides feedback to the current user through the second media content, thereby improving the sense of participation and immersion of the user, and improving the viewing experience of the user.

Figure 5:
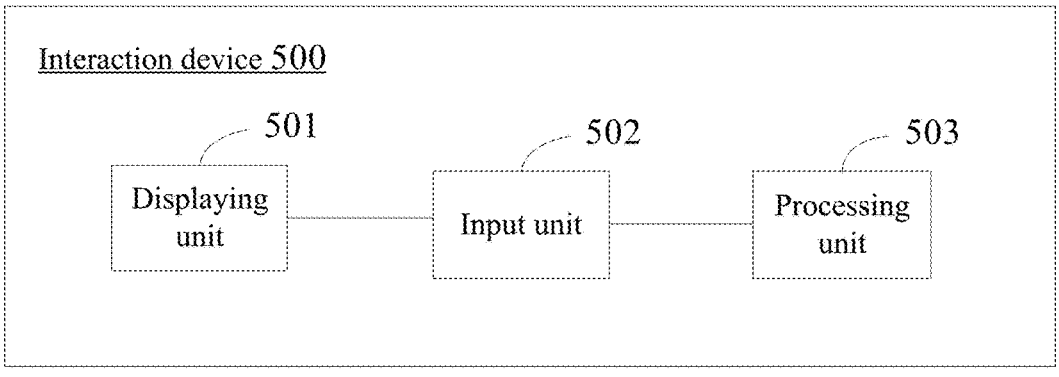
FIG. 5 is a structural block diagram of an interaction device provided by an embodiment of the present disclosure.

Corresponding to the interaction method in the previous embodiment, FIG. 5 is a structural block diagram of an interaction device provided by an embodiment of the present disclosure. For ease of explanation, only the parts related to an embodiment of the present disclosure are shown. Referring to FIG. 5, the interaction device 500 includes a displaying unit 501, an input unit 502, and a processing unit 503.

The displaying unit 501 is configured to display an input control during a process of playing a first media content through a playback control in an interaction interface;

the input unit 502 is configured to obtain input information of a current user from the input control;

the displaying unit 501 is further configured to display the input information and associated information of the input information;

the processing unit 503 is configured to judge whether the input information and the associated information meet a preset condition, and display a second media content based on a result of the judging.

According to one or more embodiments of the present disclosure, the display unit 501, when displaying the input control during the process of playing the first media content through the playback control in the interaction interface, is configured to:

during the process of playing the first media content through the playback control in the interaction interface, display the input control if it is detected that the first media content is played to a preset moment, or the first media content is played to a preset content.

According to one or more embodiments of the present disclosure, the processing unit 503, when judging whether the input information and the associated information meet the preset condition, and displaying the second media content based on the result of the judging, is configured to:

judge whether the input information of the current user matches the associated information;

obtain the corresponding second media content and display the second media content through the displaying unit 501 if it is determined that the input information of the current user matches the associated information.

According to one or more embodiments of the present disclosure, the processing unit 503 is further configured to:

obtain a corresponding third media content if it is determined that the input information of the current user does not match the associated information, and display the third media content through the displaying unit 501.

According to one or more embodiments of the present disclosure, the input control includes a score input control, and the input unit 502, when obtaining the input information of the current user from the input control, is configured to:

obtain a score input instruction input by the current user for the first media content from the score input control, and determine first score information input by the current user based on the score input instruction;

the processing unit 503 is further configured to:

before displaying the input information and the associated information of the input information, obtain second score information, and determine the second score information as the associated information of the first score information input by the current user, where the second score information is score information which is obtained based on the first score information input by multiple different users.

According to one or more embodiments of the present disclosure, the processing unit 503, when judging whether the input information of the current user matches the associated information, is configured to:

if a difference between the first score information input by the current user and the second score information is within a preset threshold range, determine that the input information of the current user matches the associated information; or if a difference between the first score information input by the current user and the second score information is not within a preset threshold range, determine that the input information of the current user does not match the associated information.

According to one or more embodiments of the present disclosure, the input control includes a selection instruction input control, and the input unit 502, when obtaining the input information of the current user from the input control, is configured to:

obtain a selection instruction input by the current user for at least two alternative contents from the selection instruction input control, and determine selection information of the current user for the alternative contents based on the selection instruction.

the processing unit 503 is further configured to:

before displaying the input information and the associated information of the input information, obtain selection result information for the at least two alternative contents, and determine the selection result information as the associated information of the selection information of the current user for the alternative contents.

According to one or more embodiments of the present disclosure, the processing unit 503, when judging whether the input information of the current user matches the associated information, is configured to:

if the selection information of the current user for the alternative contents is same as the selection result information, determine that the input information of the current user matches the associated information; or if the selection information of the current user for the alternative contents is different from the selection result information, determine that the input information of the current user does not match the associated information.

The interaction device provided in this embodiment may be used to execute the technical solution of the above interaction method embodiment, whose implementation principles and technical effects are similar, and will not be repeated in this embodiment.

Figure 6:
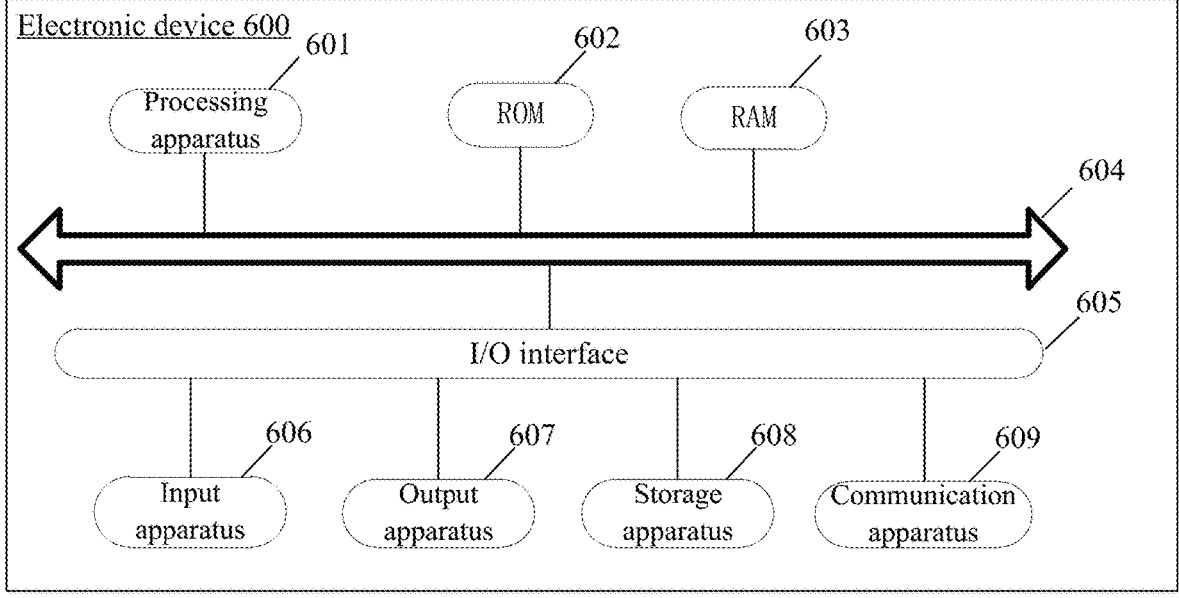
FIG. 6 is a schematic diagram of a hardware structure of an electronic device provided by an embodiment of the present disclosure.

Referring to FIG. 6, it shows a schematic structural diagram of an electronic device 600 suitable for implementing the embodiments of the present disclosure. The electronic device 600 may be a terminal device or a server. The terminal device may include, but is not limited to, mobile terminals such as a mobile phone, a notebook computer, a digital broadcast receiver, a personal digital assistant (Personal Digital Assistant, PDA), a portable android device (Portable Android Device, PAD), a portable multimedia player (Portable Media Player, PMP), a vehicle-mounted terminal (such as a vehicle navigation terminal), and stationary terminals such as a digital TV, a desktop computer. The electronic device shown in FIG. 6 is only an embodiment, which should not impose any limitation on the function and applying scope of the embodiments of the present disclosure.

As shown in FIG. 6, the electronic device 600 may include a processing apparatus (such as, a central processing unit, a graphics processor, etc.) 601, and the processing apparatus 601 may perform various appropriate actions and processing according to a program stored in a read only memory (Read only memory, ROM) 602 or a program loaded from a storage apparatus 608 into a random access memory (Random access memory, RAM) 603. Various programs and data necessary for the operation of the electronic device 600 are also stored in the RAM 603. The processing apparatus 601, ROM 602, and RAM 603 are connected to each other through a bus 604. And an input/output (I/O) interface 605 is also connected to the bus 604.

Generally, the following apparatuses may be connected to the I/O interface 605: an input apparatus 606 including, for example, a touch screen, a touchpad, a keyboard, a mouse, a camera, a microphone, an accelerometer, a gyroscope, etc.; an output apparatus 607 including, for example, a liquid crystal display (Liquid crystal display, LCD), a speaker, a vibration, etc.; a storage apparatus 608 including, for example, a magnetic tape, a hard disk, etc.; and a communication apparatus 609. The communication apparatus 609 may allow the electronic device 600 to communicate wirelessly or by wire with other devices to exchange data. Although FIG. 6 shows the electronic device 600 having various apparatuses, it should be understood that not all of the illustrated apparatuses are required to be implemented or provided. More or fewer apparatuses may alternatively be implemented or provided.

Specially, according to an embodiment of the present disclosure, the processes described above with reference to the flowcharts may be implemented as a computer software program. For example, an embodiment of the present disclosure includes a computer program product including a computer program carried on a computer-readable medium, where the computer program includes program code for performing the method illustrated in the respective flowcharts. In such embodiment, the computer program may be downloaded and installed from a network via the communication apparatus 609, or installed from the storage apparatus 608, or installed from the ROM 602. When the computer program is executed by the processing apparatus 601, the above functions defined in the embodiments of the present disclosure are implemented.

It should be noted that the computer-readable medium described in the present disclosure may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or a combination thereof. More specific examples of the computer-readable storage medium may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in baseband or as part of a carrier wave, carrying computer-readable program code therein. Such propagated data signal may be in a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program code included on the computer-readable medium may be transmitted through any suitable medium including, but not limited to, an electrical wire, an optical fiber cable, a RF (Radio Frequency), etc., or any suitable combination thereof.

The computer-readable medium may be included in the above electronic device; and may also exist independently without being assembled into the electronic device.

The computer-readable medium carries one or more programs, and the one or more programs, when executed by the electronic device, cause the electronic device to execute the method shown in the above embodiments.

The computer program code for performing an operation of the present disclosure may be written in one or more programming languages or a combination thereof, where the above programming languages include an object-oriented programming language, such as Java, Smalltalk, and C++, as well as a conventional procedural programming language, such as "C" language or similar programming languages. The program code may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (Local Area Network, LAN) or a wide area network (Wide Area Network, WAN), or may be connected to an external computer (e.g., connected via the Internet using an Internet service provider).

The flowcharts and block diagrams in the figures illustrate the architecture, functionality, and operation of possible implementations of systems, methods and computer program products according to various embodiments of the present disclosure. In this regard, each block in the flowcharts or block diagrams may represent a module, a program segment, or a portion of code that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or be executed in a reverse order sometimes, depending on the functionality involved. It should also be noted that each block of the block diagrams and/or flowcharts, or a combination of blocks in the block diagrams and/or flowcharts may be implemented with a special-purposed hardware-based system that performs a specified function or operation, or may be implemented with a combination of special-purposed hardware and a computer instruction.

The involved units described in embodiments of the present disclosure may be implemented by means of software, and may also be implemented by means of hardware. Names of these units do not constitute a limitation on the units per se under certain circumstances, for example, a first acquisition unit may also be described as "a unit for acquiring at least two Internet protocol addresses".

The foregoing functions described herein may be executed, at least in part, by one or more hardware logic components. For example, without limitation, exemplary types of hardware logic components that may be used include: a field programmable gate array (Field programmable gate array, FPGA), an application specific integrated circuit (Application specific integrated circuit, ASIC), an application specific standard product (Application specific standard parts, ASSP), a system on chip (System on chip, SOC), a complex programmable logical device (Complex programmable logic device, CPLD) and more.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the foregoing. More specific examples of the machine-readable storage medium would include an electrical connection based on one or more wires, a portable computer disk, a hard disk, a random access memory (RAM), a read only memory (ROM), an erasable programmable read only memory (EPROM or flash memory), an optic fiber, a portable compact disk read only memory (CD-ROM), an optical storage device, a magnetic storage device, or any suitable combination of the foregoing.

In a first aspect, according to one or more embodiments of the present disclosure, an interaction method is provided, including:

> displaying an input control during a process of playing a first media content through a playback control in an interaction interface;
> obtaining input information of a current user from the input control;
> displaying the input information and associated information of the input information;
> judging whether the input information and the associated information meet a preset condition, and displaying a second media content based on a result of the judging.

According to one or more embodiments of the present disclosure, the displaying the input control during the process of playing the first media content through the playback control in the interaction interface, includes:

> during the process of playing the first media content through the playback control in the interaction interface, displaying the input control if it is detected that the first media content is played to a preset moment, or the first media content is played to a preset content.

According to one or more embodiments of the present disclosure, the judging whether the input information and the associated information meet the preset condition, and displaying the second media content based on the result of the judging, includes:

> judging whether the input information of the current user matches the associated information;
> obtaining the corresponding second media content and displaying the second media content if it is determined that the input information of the current user matches the associated information.

According to one or more embodiments of the present disclosure, the method further includes:

> obtaining a corresponding third media content if it is determined that the input information of the current user does not match the associated information, and displaying the third media content.

According to one or more embodiments of the present disclosure, the input control includes a score input control, where the obtaining, from the input control, the input information of the current user, includes:

> obtaining, from the score input control, a score input instruction input by the current user for the first media content, and determining, based on the score input instruction, first score information input by the current user;
> before the displaying the input information and the associated information of the input information, the method further includes:
> obtaining second score information, and determining the second score information as the associated information of the first score information input by the current user, where the second score information is score information which is obtained based on the first score information input by multiple different users.

According to one or more embodiments of the present disclosure, the judging whether the input information of the current user matches the associated information, includes:

> if a difference between the first score information input by the current user and the second score information is within a preset threshold range, determining that the input information of the current user matches the associated information; or
> if a difference between the first score information input by the current user and the second score information is not within a preset threshold range, determining that the input information of the current user does not match the associated information.

According to one or more embodiments of the present disclosure, the input control includes a selection instruction input control, where the obtaining, from the input control, the input information of the current user, includes:

> obtaining a selection instruction input by the current user for at least two alternative contents from the selection instruction input control, and determining, based on the selection instruction, selection information of the current user for the alternative contents;
> before the displaying the input information and the associated information of the input information, the method further includes:
> obtaining selection result information for the at least two alternative contents, and determining the selection result information as the associated information of the selection information of the current user for the alternative contents.

According to one or more embodiments of the present disclosure, the judging whether the input information of the current user matches the associated information, includes:

> if the selection information of the current user for the alternative contents is same as the selection result information, determining that the input information of the current user matches the associated information; or
> if the selection information of the current user for the alternative contents is different from the selection result information, determining that the input information of the current user does not match the associated information.

In a second aspect, according to one or more embodiments of the present disclosure, an interaction device is provided, including:

a displaying unit, configured to display an input control during a process of playing a first media content through a playback control in an interaction interface;

a input unit, configured to obtain input information of a current user from the input control;

the displaying unit is further configured to display the input information and associated information of the input information;

a processing unit, configured to judge whether the input information and the associated information meet a preset condition, and display a second media content based on a result of the judging.

According to one or more embodiments of the present disclosure, the display unit, when displaying the input control during the process of playing the first media content through the playback control in the interaction interface, is configured to:

during the process of playing the first media content through the playback control in the interaction interface, display the input control if it is detected that the first media content is played to a preset moment, or the first media content is played to a preset content.

According to one or more embodiments of the present disclosure, the processing unit, when judging whether the input information and the associated information meet the preset condition, and displaying the second media content based on the result of the judging, is configured to:

judge whether the input information of the current user matches the associated information;

obtain the corresponding second media content and display the second media content through the displaying unit if it is determined that the input information of the current user matches the associated information.

According to one or more embodiments of the present disclosure, the processing unit is further configured to:

obtain a corresponding third media content if it is determined that the input information of the current user does not match the associated information, and display the third media content through the displaying unit.

According to one or more embodiments of the present disclosure, the input control includes a score input control, and the input unit, when obtaining the input information of the current user from the input control, is configured to:

obtain a score input instruction input by the current user for the first media content from the score input control, and determine first score information input by the current user based on the score input instruction;

the processing unit is further configured to:

before displaying the input information and the associated information of the input information, obtain second score information, and determine the second score information as the associated information of the first score information input by the current user, where the second score information is score information which is obtained based on the first score information input by multiple different users.

According to one or more embodiments of the present disclosure, the processing unit, when judging whether the input information of the current user matches the associated information, is configured to:

if a difference between the first score information input by the current user and the second score information is within a preset threshold range, determine that the input information of the current user matches the associated information; or if a difference between the first score information input by the current user and the second score information is not within a preset threshold range, determine that the input information of the current user does not match the associated information.

According to one or more embodiments of the present disclosure, the input control includes a selection instruction input control, and the input unit, when obtaining the input information of the current user from the input control, is configured to:

obtain a selection instruction input by the current user for at least two alternative contents from the selection instruction input control, and determine selection information of the current user for the alternative contents based on the selection instruction;

the processing unit is further configured to:

before displaying the input information and the associated information of the input information, obtains selection result information for the at least two alternative contents, and determines the selection result information as the associated information of the selection information of the current user for the alternative contents.

According to one or more embodiments of the present disclosure, the processing unit, when judging whether the input information of the current user matches the associated information, is configured to:

if the selection information of the current user for the alternative contents is same as the selection result information, determining that the input information of the current user matches the associated information; or if the selection information of the current user for the alternative contents is different from the selection result information, determining that the input information of the current user does not match the associated information.

In a third aspect, according to one or more embodiments of the present disclosure, an electronic device is provided, including at least one processor, a memory, and a display;

where the memory stores computer execution instructions;

the at least one processor executes the computer execution instructions stored in the memory, enabling the at least one processor to execute the interaction method described in the first aspect and various possible designs of the first aspect.

In a fourth aspect, according to one or more embodiments of the present disclosure, a computer readable storage medium is provided, where the computer readable storage medium stores computer execution instructions, when the computer execution instructions are executed by a processor, the interaction method described in the first aspect and various possible designs of the first aspect is implemented.

In a fifth aspect, according to one or more embodiments of the present disclosure, a computer program product is provided, including computer instructions that, when executed by a processor, the interaction method described in the first aspect and various possible designs of the first aspect is implemented.

In a sixth aspect, according to one or more embodiments of the present disclosure, a computer program is provided, and when the computer program is executed by a processor, the interaction method described in the first aspect and various possible designs of the first aspect is implemented.

The above descriptions are merely preferred embodiments of the present disclosure and illustrations of applied technical principles. The person skilled in the art should understand that a disclosure scope involved in the present disclosure is not limited to the technical solution formed by the specific combination of the above-mentioned technical features, and should also cover other technical solutions formed by any combination of the above technical features or their equivalents without departing from the above disclosure concept, for example, a technical solution formed by replacing the above features with the technical features with similar functions disclosed in the present disclosure (but not limited to).

In addition, although operations are depicted in a particular order, it should not be understood as requiring these operations to be performed in the specific order shown or in the sequential order. Under a certain circumstance, multitasking and parallel processing may be advantageous. Likewise, although the above discussion contains several details of specific implementations, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable subcombination.

Although the subject matter has been described in a language specific to a structural feature and/or a methodological action, it should be understood that the subject matter defined in the appended claims is not necessarily limited to the specific features or actions described above. On the contrary, the specific features and actions described above are merely example forms for implementing the claims.

What is claimed is:

1. An interaction method, comprising:
displaying an input control during a process of playing a first media content through a playback control in an interaction interface;
obtaining input information of a current user from the input control;
displaying the input information and associated information of the input information, wherein the associated information is determined based on input information of multiple users or determined based on subjective opinions of multiple different users;
judging whether the input information of the current user matches the associated information; and
at least one of:
obtaining a corresponding second media content and displaying the second media content if it is determined that the input information of the current user matches the associated information; or
obtaining a corresponding third media content if it is determined that the input information of the current user does not match the associated information, and displaying the third media content, wherein
the input control comprises a score input control,
the obtaining the input information of the current user from the input control comprises:
obtaining, from the score input control, a score input instruction input by the current user for the first media content, and determining, based on the score input instruction, first score information input by the current user, and before the displaying the input information and the associated information of the input information, the method further comprises:
obtaining second score information, and determining the second score information as the associated information of the first score information input by the current user, wherein the second score information is determined based on the first score information input by multiple different users.

2. The method according to claim 1, wherein the judging whether the input information of the current user matches the associated information comprises:
if a difference between the first score information input by the current user and the second score information is within a preset threshold range, determining that the input information of the current user matches the associated information; or
if a difference between the first score information input by the current user and the second score information is not within a preset threshold range, determining that the input information of the current user does not match the associated information.

3. The method according to claim 1, wherein the displaying the input control during the process of playing the first media content through the playback control in the interaction interface comprises:
during the process of playing the first media content through the playback control in the interaction interface, displaying the input control if it is detected that the first media content is played to a preset moment, or the first media content is played to a preset content.

4. The method according to claim 1, wherein the first score information is input by the current user within a predetermined time window and the second score information is score information obtained based on the first score information input by the multiple different users within the predetermined time window.

5. An interaction device, comprising:
at least one processor, a memory, and a display, wherein the memory stores computer execution instructions, and the at least one processor executes the computer execution instructions stored in the memory, enabling the at least one processor to:
display an input control during a process of playing a first media content through a playback control in an interaction interface;
obtain input information of a current user from the input control;
display the input information and associated information of the input information, wherein the associated information is determined based on input information of multiple users or determined based on subjective opinions of multiple different users;
judge whether the input information of the current user matches the associated information; and
at least one of:
obtain a corresponding second media content and display the second media content if it is determined that the input information of the current user matches the associated information; or
obtain a corresponding third media content if it is determined that the input information of the current user does not match the associated information, and display the third media content,
the input control comprises a score input control, the at least one processor is further configured to:

obtain, from the score input control, a score input instruction input by the current user for the first media content, and determine, based on the score input instruction, first score information input by the current user, and before the display the input information and the associated information of the input information, the at least one processor is further configured to:

obtain second score information, and determine the second score information as the associated information of the first score information input by the current user, wherein the second score information is determined based on the first score information input by multiple different users.

6. The interaction device according to claim 5, wherein the at least one processor is further configured to:

during the process of playing the first media content through the playback control in the interaction interface, display the input control if it is detected that the first media content is played to a preset moment, or the first media content is played to a preset content.

7. The interaction device according to claim 5, wherein the at least one processor is further configured to:

if a difference between the first score information input by the current user and the second score information is within a preset threshold range, determine that the input information of the current user matches the associated information; or if a difference between the first score information input by the current user and the second score information is not within a preset threshold range, determine that the input information of the current user does not match the associated information.

8. The interaction device according to claim 5, wherein the first score information is input by the current user within a predetermined time window and the second score information is score information obtained based on the first score information input by the multiple different users within the predetermined time window.

9. A non-transitory computer-readable storage medium having computer execution instructions stored thereon, wherein when the computer execution instructions are executed by a processor, the processor is enabled to:

display an input control during a process of playing a first media content through a playback control in an interaction interface;

obtain input information of a current user from the input control;

display the input information and associated information of the input information, wherein the associated information is determined based on input information of multiple users or determined based on subjective opinions of multiple different users;

judge whether the input information of the current user matches the associated information; and at least one of:

obtain a corresponding second media content and display the second media content if it is determined that the input information of the current user matches the associated information; or obtain a corresponding third media content if it is determined that the input information of the current user does not match the associated information, and display the third media content, wherein the input control comprises a score input control, the processor is further enabled to:

obtain, from the score input control, a score input instruction input by the current user for the first media content, and determine, based on the score input instruction, first score information input by the current user, and before the display the input information and the associated information of the input information, the processor is further enabled to:

obtain second score information, and determine the second score information as the associated information of the first score information input by the current user, wherein the second score information determined based on the first score information input by multiple different users.

10. The non-transitory computer-readable storage medium according to claim 9, wherein the processor is further enabled to:

during the process of playing the first media content through the playback control in the interaction interface, display the input control if it is detected that the first media content is played to a preset moment, or the first media content is played to a preset content.

11. The non-transitory computer-readable storage medium according to claim 9, wherein the processor is further enabled to:

if a difference between the first score information input by the current user and the second score information is within a preset threshold range, determine that the input information of the current user matches the associated information; or if a difference between the first score information input by the current user and the second score information is not within a preset threshold range, determine that the input information of the current user does not match the associated information.

12. The non-transitory computer-readable storage medium according to claim 9, wherein the first score information is input by the current user within a predetermined time window and the second score information is score information obtained based on the first score information input by the multiple different users within the predetermined time window.

* * * * *